UNITED STATES PATENT OFFICE.

GUILLERMO P. DE GUZMÁN, OF PAWLING, NEW YORK, ASSIGNOR TO P. G. PICKMAN & BROS., INC., OF PAWLING, NEW YORK, A CORPORATION OF NEW YORK.

COMPOSITION OF MATTER.

1,096,605.     Specification of Letters Patent.     Patented May 12, 1914.

No Drawing.     Application filed October 21, 1913. Serial No. 796,469.

*To all whom it may concern:*

Be it known that I, GUILLERMO P. DE GUZMÁN, a subject of the King of Spain, residing at Pawling, Dutchess county, New York State, have invented certain new and useful Improvements in Compositions of Matter, which are set forth in the following specification.

My invention relates to a new composition of matter in the nature of a liquid, chocolate composition suitable for use as an article of food.

In particular, my object is to provide a chocolate preparation in the form of a liquid, which can be bottled (or canned) and kept for an indefinite period without change in its physical or chemical characteristics.

The basis of my composition is pulverized chocolate, and milk, but the milk is of a form in which the fatty and watery components are permanently coalesced into an inseparable compound, and I have discovered that the chocolate can be similarly coalesced inseparably with the milk, the ingredients when thus intimately and permanently associated being bottled and the compound sterilized by heat. A composition thus produced can be kept in the bottle for years without separation of the ingredients or deterioration by climatic condition or lapse of time and can at any moment be used immediately as a beverage, either with or without heating as may be desired.

While the ingredients above mentioned form the basis of my composition, I intend to add other substances to modify its flavor, the formula which I prefer being approximately as follows:—chocolate 25, cocoa 12½, milk 50, sugar 10 and vanilla 2½. These additional ingredients are preferably mixed with the powdered chocolate and cocoa previous to treatment, and then, together with the milk are homogenized, *i. e.* subjected to a high degree of mechanical agitation, together with an alternate squeezing through a small orifice under heavy pressure which will ultimately produce an emulsion of the chocolate and cocoa with the milk, as well as a similar union of the fatty and the watery constituents of the milk. The resulting compound is one that will stand indefinitely thereafter without separating, retaining its liquid and homogeneous character. The liquid is then bottled, or canned, and sealed and then sterilized by heat.

What I claim as new and desire to secure by Letters Patent is:

1. A liquid composition comprising a homogenized emulsion of chocolate and milk.

2. A liquid composition comprising milk, having its constituents homogenized, and chocolate formed into a homogenized emulsion with said milk.

3. A liquid composition comprising a homogenized emulsion of chocolate, cocoa and milk.

4. A liquid composition comprising a homogenized emulsion of chocolate, cocoa and milk, together with vanilla and sugar in substantially the proportions stated.

In witness whereof I have hereunto set my hand, before two subscribing witnesses, this 20th day of October, 1913.

GUILLERMO P. DE GUZMAN.

Witnesses:
MANUEL SERIS DE GUZMÁN,
L. T. SHAW ERISMAN.